(12) United States Patent
Lee et al.

(10) Patent No.: US 11,036,640 B2
(45) Date of Patent: Jun. 15, 2021

(54) CONTROLLER, OPERATING METHOD THEREOF, AND MEMORY SYSTEM INCLUDING THE SAME

(71) Applicant: SK hynix Inc., Gyeonggi-do (KR)

(72) Inventors: Joung Young Lee, Gyeonggi-do (KR); Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/717,932

(22) Filed: Dec. 17, 2019

(65) Prior Publication Data
US 2020/0334159 A1     Oct. 22, 2020

(30) Foreign Application Priority Data

Apr. 16, 2019   (KR) ........................ 10-2019-0044455

(51) Int. Cl.
| | |
|---|---|
| *G06F 12/08* | (2016.01) |
| *G06F 12/0868* | (2016.01) |
| *G06F 12/02* | (2006.01) |
| *G06F 12/06* | (2006.01) |
| *G06F 12/0873* | (2016.01) |
| *G06F 3/06* | (2006.01) |

(52) U.S. Cl.
CPC ........ *G06F 12/0868* (2013.01); *G06F 3/0611* (2013.01); *G06F 3/0656* (2013.01); *G06F 3/0659* (2013.01); *G06F 3/0679* (2013.01); *G06F 12/0246* (2013.01); *G06F 12/0646* (2013.01); *G06F 12/0873* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2018/0039578 A1* | 2/2018 | Yun | ...................... G06F 3/0656 |
| 2020/0133566 A1* | 4/2020 | Kim | ...................... H04L 9/3247 |
| 2020/0151055 A1* | 5/2020 | Eom | ...................... G06F 3/0619 |
| 2020/0151109 A1* | 5/2020 | Cho | .................... G06F 12/0238 |

FOREIGN PATENT DOCUMENTS

| | | |
|---|---|---|
| KR | 1020150116008 | 10/2015 |
| KR | 1020160013351 | 2/2016 |
| KR | 1020180054394 | 5/2018 |

* cited by examiner

*Primary Examiner* — Kevin Verbrugge
(74) *Attorney, Agent, or Firm* — IP & T Group LLP

(57) ABSTRACT

A controller, an operating method thereof, and a memory system including the same are disclosed. The controller includes a controller for controlling a nonvolatile memory device according to a request from a host with a host memory. The controller includes an address unit configured to divide regions of the host memory, which is allocated as a host memory buffer (HMB), to generate a plurality of sub HMB regions, determine index values of the plurality of sub HMB regions, and generate an HMB map table by mapping virtual addresses to the index values; and a memory control module configured to access at least one among the plurality of sub HMB regions based on the HMB map table. The virtual addresses may be set to continuous values with respect to the plurality of sub HMB regions.

18 Claims, 10 Drawing Sheets

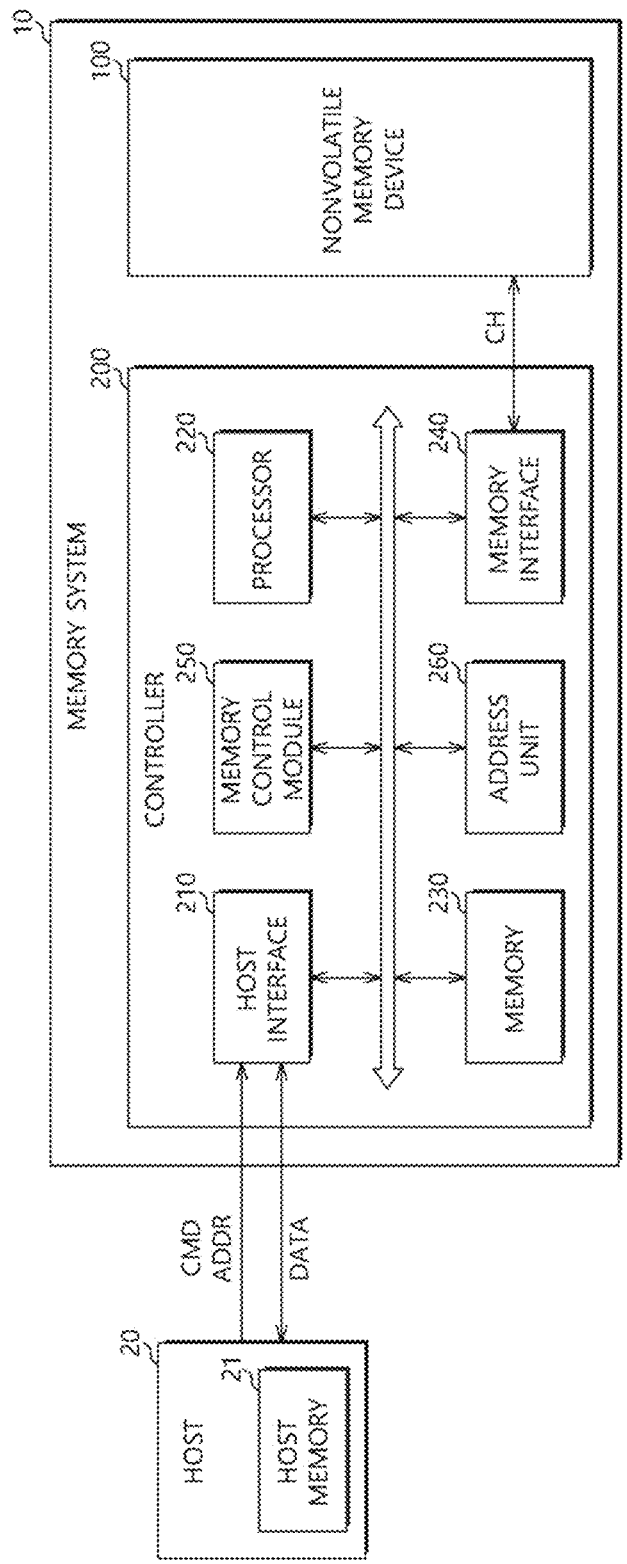

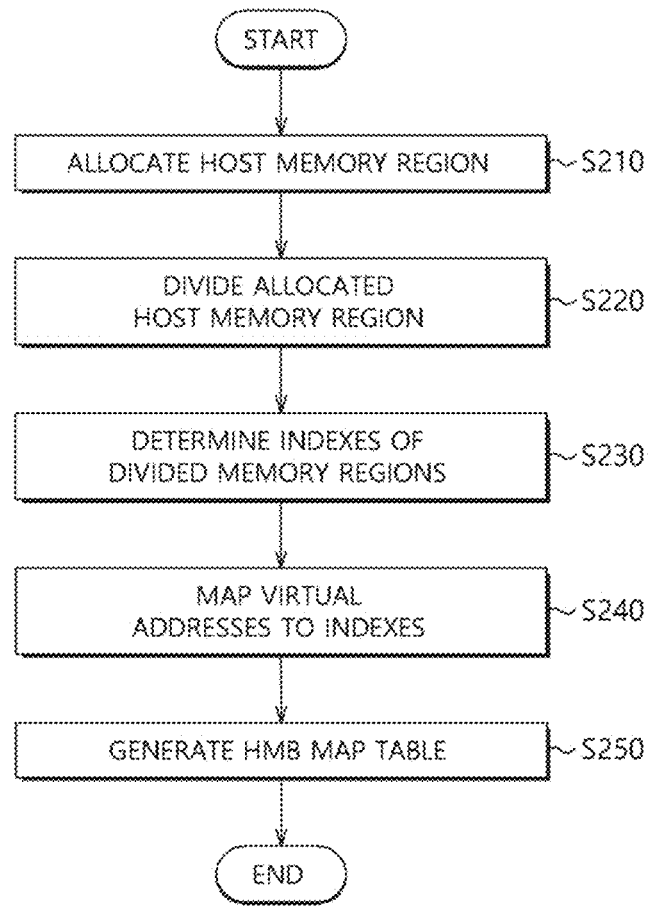

FIG.3

| Physical Address | Host Memory |
|---|---|
| 0x20000000 | Region_0 |
|  | Region_1 |
| 0x20003000 |  |
|  | Region_2(HMB_0) |
| 0x20004000 |  |
|  | Region_3 |
| 0x2000AXXX | Region_4(HMB_1) |
| 0x2000BXXX | Region_5 |
| 0x2000CXXX |  |
|  | Region_6(HMB_2) |
| 0x2000EXXX | Region_7 |
| 0x2000FXXX | Region_8(HMB_3) |
|  | Region_9 |
|  |  |
|  | Region_10(HMB_4) |
| 0x200AFXXX | Region_11 |

(a)

| | Host Memory | index |
|---|---|---|
| Sub_0 ~ | Region_0 | 0 |
| Sub_1 ~ | Region_1 | 1 |
| Sub_2 ~ | HMB_0 | 2 |
|  | Region_3 | 3 |
| Sub_3 ~ | HMB_1 | 4 |
|  | Region_5 | 5 |
| Sub_4 ~ | HMB_2 | 6 |
| Sub_5 ~ |  | 7 |
|  | Region_7 | 8 |
| Sub_6 ~ | HMB_3 | 9 |
|  | Region_9 | 10 |
| Sub_7 ~ |  | 11 |
| Sub_8 ~ | HMB_4 | 12 |
| Sub_9 ~ |  | 13 |
| Sub_10 ~ | Region_11 | 14 |

(b)

| HMB | | virtual address |
|---|---|---|
| HMB_0 | 0 | 0 |
|  | 1 | 1 |
|  | 2 | 2 |
| HMB_1 | 4 | 3 |
|  | 6 | 4 |
| HMB_2 | 7 | 5 |
| HMB_3 | 9 | 6 |
|  | 11 | 7 |
| HMB_4 | 12 | 8 |
|  | 13 | 9 |
|  | 14 | 10 |

(c)

| virtual address | Physical Address (index) |
|---|---|
| 0 | 0 |
| 1 | 1 |
| 2 | 2 |
| 3 | 4 |
| 4 | 6 |
| 5 | 7 |
| 6 | 9 |
| 7 | 11 |
| 8 | 12 |
| 9 | 13 |
| 10 | 14 |

(d)

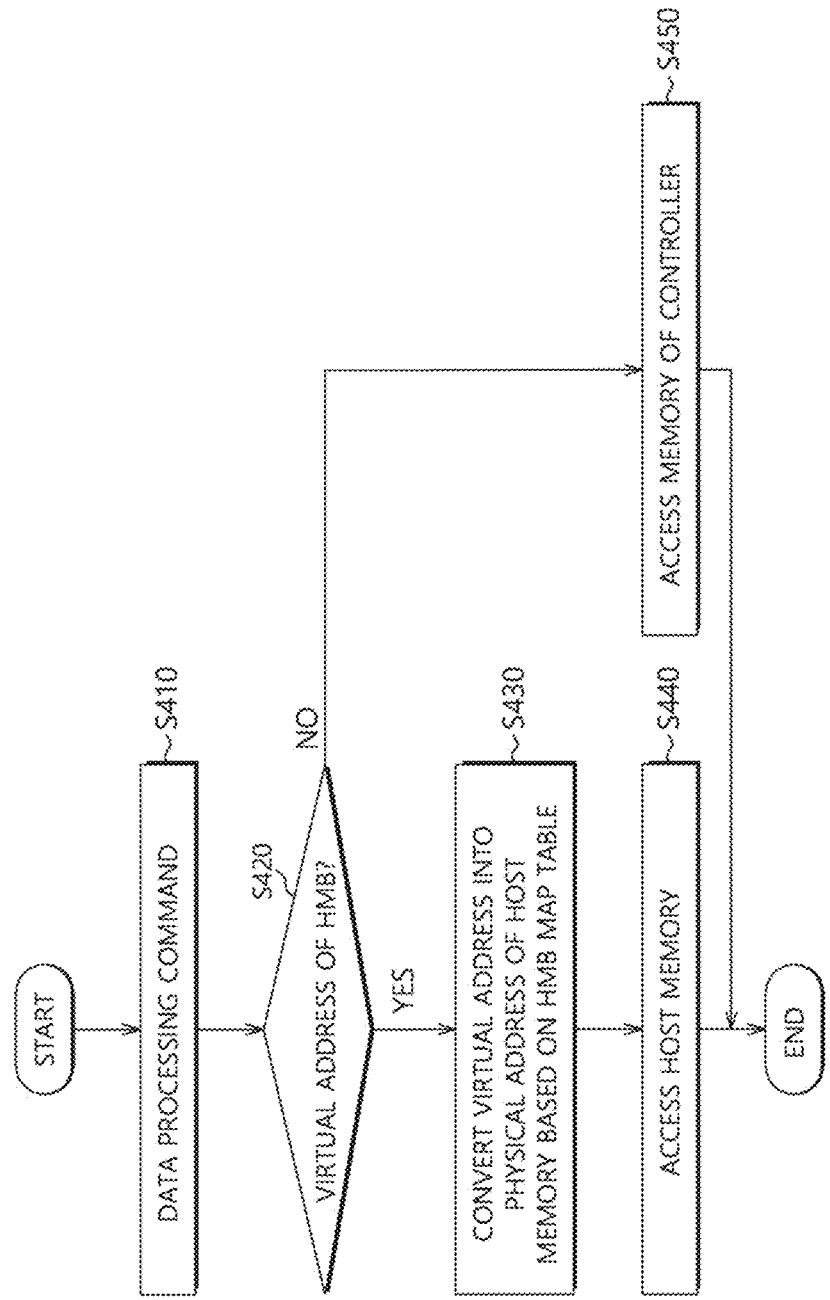

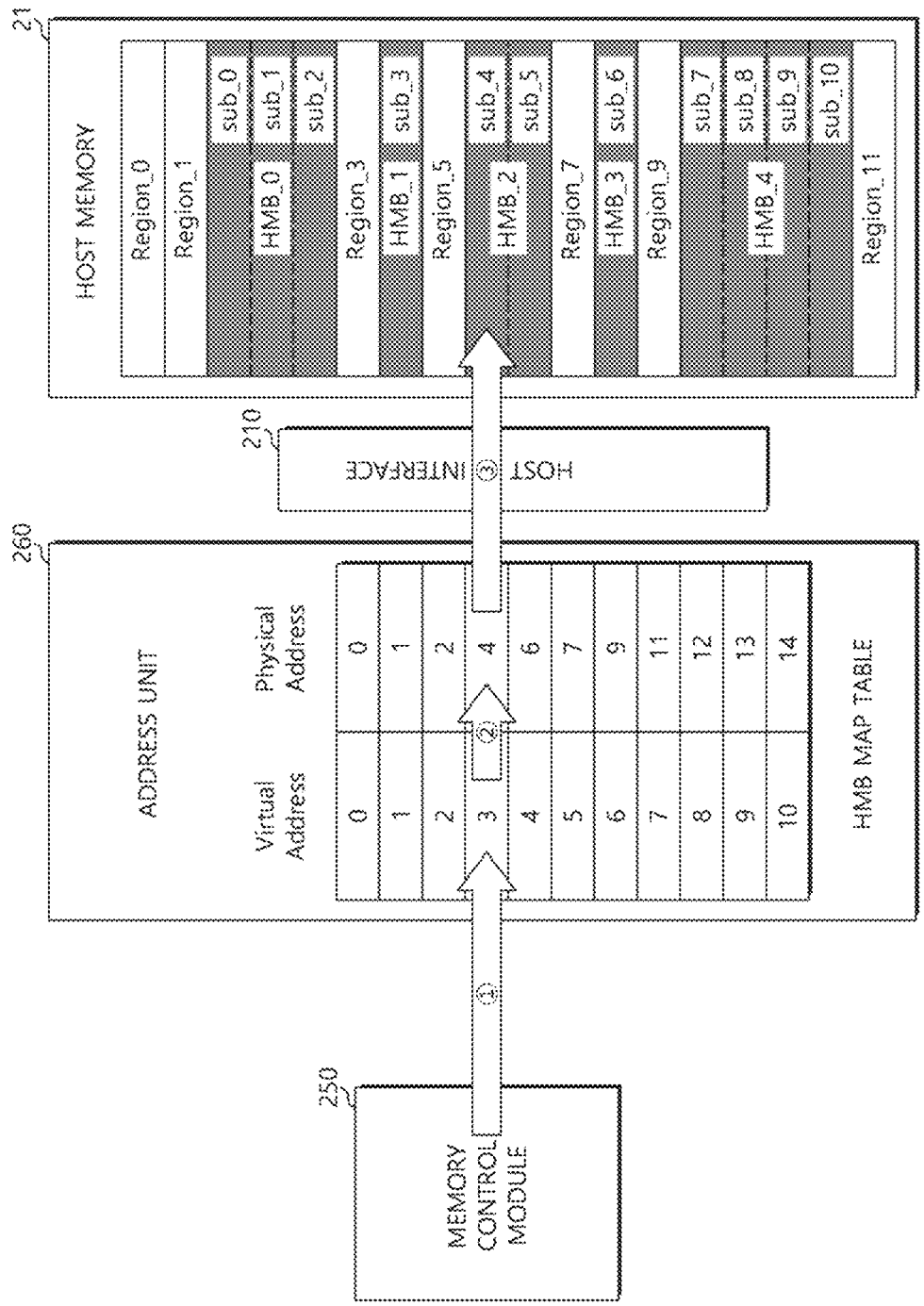

CONTROLLER, OPERATING METHOD THEREOF, AND MEMORY SYSTEM INCLUDING THE SAME

CROSS-REFERENCES TO RELATED APPLICATION

The present application claims priority under 35 U.S.C. § 119(a) to Korean application number 10-2019-0044455, filed on Apr. 16, 2019, which is incorporated herein by reference in its entirety.

BACKGROUND

1. Technical Field

Various embodiments generally relate to a semiconductor device and, more particularly, to a controller, an operating method thereof, and a memory system including the same.

2. Related Art

In recent years, the paradigm for computer environments changed to ubiquitous computing which may use computer systems anytime and anywhere. As a result, the use of portable electronic apparatuses such as a mobile phone, a digital camera, and a laptop computer has been increasing rapidly. Generally, such portable electronic apparatuses use memory systems that employ memory devices. Memory systems may be used to store data used in the portable electronic apparatuses.

Memory systems using memory devices have no mechanical driving units, and therefore exhibit good stability and endurance, a fast information access rate, and low power consumption. Such memory systems may include a universal serial bus (USB) memory device, a memory card having various interfaces, a universal flash storage (UFS) device, a solid-state drive (SSD), and the like.

SUMMARY

Embodiments are provided for technology capable of improving performance of a memory system using a host memory.

In an embodiment of the present disclosure, a controller for controlling a nonvolatile memory device according to a request from a host with a host memory, the controller may include: an address unit configured to divide regions of the host memory, which is allocated as a host memory buffer (HMB), to generate a plurality of sub HMB regions, determine index values of the plurality of sub HMB regions, and generate an HMB map table by mapping virtual addresses to the index values; and a memory control module configured to access at least one among the plurality of sub HMB regions based on the HMB map table. The virtual addresses may be set to continuous values with respect to the plurality of sub HMB regions.

In an embodiment of the present disclosure, an operating method of a controller for controlling a nonvolatile memory device according to a request from a host with a host memory, the method may include: dividing regions of the host memory, which is allocated as a host memory buffer (HMB), to generate a plurality of sub HMB regions; determining index values for addresses of the plurality of sub HMB regions; and generating an HMB map table by mapping virtual addresses to the determined index values. The virtual addresses may be set to continuous values with respect to the plurality of sub HMB regions.

In an embodiment of the present disclosure, a memory system which includes a nonvolatile memory device and a controller configured to control the nonvolatile memory device according to a request from a host with a host memory. The controller may divides regions of the host memory, which is allocated as a host memory buffer (HMB), to generate a plurality of sub HMB regions, determines offset values for addresses of the plurality of sub HMB regions, and generates an HMB map table by mapping virtual addresses to the offset values.

According to an embodiment of the present disclosure, the performance of a memory system using a host memory can be improved.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 1 is a diagram illustrating a memory system according to an embodiment of the present disclosure;

FIGS. 2 and 3 are diagrams describing an operating method of a memory system according to an embodiment of the present disclosure;

FIGS. 4 and 5 are diagrams describing an operating method of a memory system according to an embodiment of the present disclosure;

DETAILED DESCRIPTION

Figure 6:
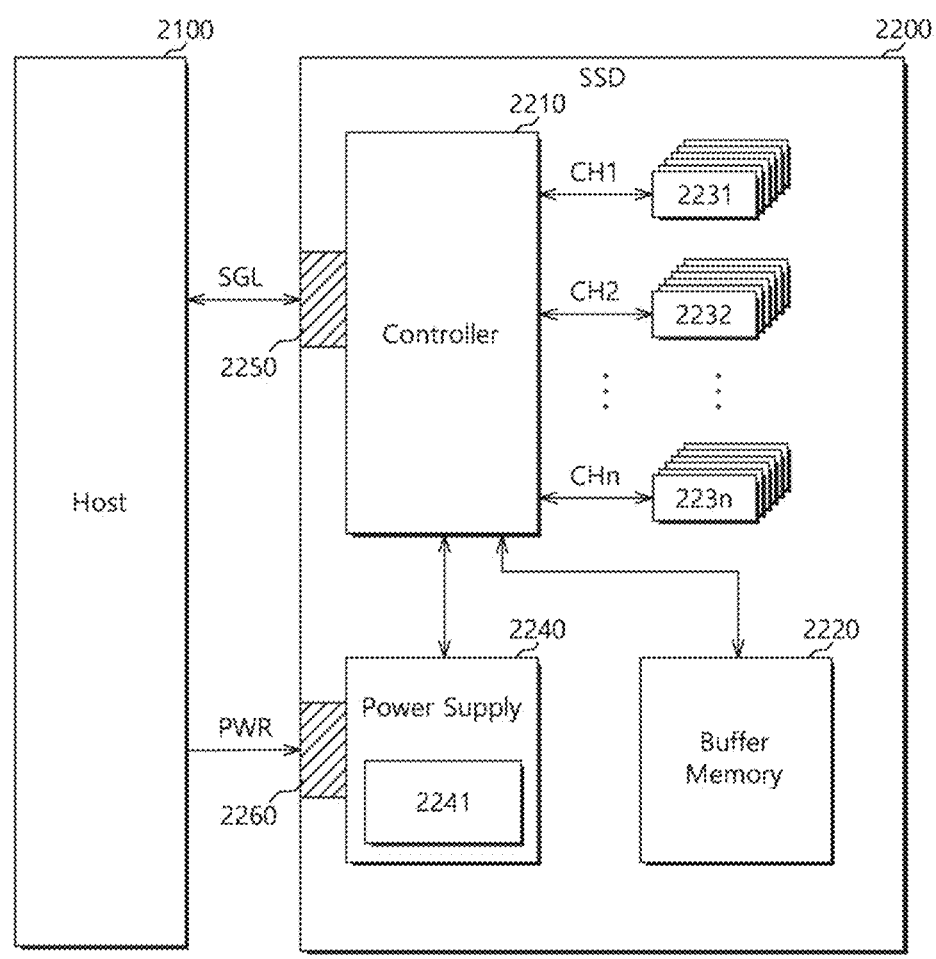
FIG. 6 is a diagram illustrating a data processing system including a solid-state drive (SSD) according to an embodiment of the present disclosure.

Various embodiments of the present invention will be described in greater detail with reference to the accompanying drawings. The drawings are simplified schematic illustrations of various embodiments of the present invention. As such, well-known elements not necessary for understanding the present invention may be omitted for avoiding obfuscating the disclosure. Thus, the described embodiments should not be construed as being limited to the particular configurations illustrated herein but may include deviations in configurations which do not depart from the spirit and scope of the present invention as defined in the appended claims.

Moreover, although only a few embodiments of the present invention are described, it will be appreciated by those of ordinary skill in the art that many other embodiment and changes thereof may be made without departing from the scope and spirit of the present invention.

FIG. 1 is a diagram illustrating a memory system 10 according to an embodiment of the present disclosure.

Referring to FIG. 1, the memory system 10 may store data to be accessed by a host 20, such as a mobile phone, an MP3 player, a laptop computer, a desktop computer, a game player, a television (TV), an in-vehicle infotainment system, and the like. The host 20 may include a host memory 21.

The memory system 10 may form various types of storage devices according to an interface protocol coupled to the host 20. For example, the memory system 10 may be configured of one of various types of storage devices, such as a solid-state drive (SSD), a multimedia card in the form of MMC, eMMC, RS-MMC, and micro-MMC, a secure digital card in the form of SD, mini-SD, and micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and the like.

The memory system 10 may be implemented as one among various types of packages, such as a package on package (POP), a system in package (SIP), a system on chip (SOC), a multi-chip package (MCP), a chip on board (COB), a wafer-level fabricated package (WFP), and a wafer-level stack package (WSP).

The memory system 10 may include a nonvolatile memory device 100 and a controller 200.

The nonvolatile memory device 100 may operate as a storage medium of the memory system 10. Depending on the type of memory cells configuring the nonvolatile memory device, the nonvolatile memory device 100 may be implemented as one of various nonvolatile memory devices, such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase-change random-access memory (PRAM) using a chalcogenide alloy, and a resistive random-access memory (ReRAM) using a transition metal compound.

Although it has been illustrated in FIG. 1 that the memory system 10 includes a single nonvolatile memory device 100, the memory system 10 may include a plurality of nonvolatile memory devices 100.

The nonvolatile memory device 100 may include a memory cell array 110 (see FIG. 11) including a plurality of memory cells MC arranged in regions in which a plurality of word lines WL1 to WLm and a plurality of bit lines BL1 to BLn cross each other. The memory cell array 110 may include a plurality of memory blocks and each of the plurality of memory blocks may include a plurality of pages.

For example, each of the memory cells in the memory cell array may be a single level cell (SLC) capable of storing a single bit data (for example, 1-bit data) or a multi level cell (MLC) capable of storing 2-bit or more data. The MLC may store 2-bit data, 3-bit data, 4-bit data, and the like. In general, a memory cell capable of storing 2-bit data may be referred to as a MLC, a memory cell capable of storing 3-bit data may be referred to as a triple level cell (TLC), and a memory cell capable of storing 4-bit data may be referred to as a quadruple level cell (QLC). However, for clarity, the memory cells in which the 2-bit or greater data are to be stored may be collectively referred to as the MLC in the disclosed embodiments.

The memory cell array 110 may include at least one or more memory cells of the SLC and the MLC type. The memory cell array 110 may include memory cells arranged in a two-dimensional (2D) (e.g., horizontal) structure or memory cells arranged in a 3D (e.g., vertical) structure. A nonvolatile memory device 100 is described later in detail with reference to FIG. 11.

The controller 200 may include a host interface 210, a processor 220, a memory 230, a memory interface 240, a memory control module 250, and an address unit 260. The controller 200 may control an overall operation of the memory system 10 by driving firmware or software loaded into the memory 230. The controller 200 may decode and drive a code-based instruction or algorithm, such as firmware or software. The controller 200 may be implemented with hardware or a combination of hardware and software.

Although not shown in FIG. 1, the controller 200 may further include other well-known circuits such as, for example, an error correction code (ECC) engine which generates a parity by performing ECC encoding on write data provided from the host 20 and performs ECC decoding on read data read out from the nonvolatile memory device 100 using the parity. All elements included in the controller 200 may be coupled to each other through an internal bus indicated generally by the double headed arrow.

The host interface 210 may interface the memory system 10 with the host 20 according to a protocol of the host 20. For example, the host interface 210 may communicate with the host 20 through any one protocol among a USB protocol, a UFS protocol, an MMC protocol, a parallel advanced technology attachment (DATA) protocol, a serial advanced technology attachment (SATA) protocol, a small computer system interface (SCSI) protocol, a serial attached SCSI (SAS) protocol, a PCI protocol, and a PCI-E protocol. The host interface 210 may be coupled to the host 20 through a host channel. Through the host channel, the host 20 may transfer a command (or a request or an instruction) CMD, an address ADRR to the memory system 10, and transmit/receive data DATA to/from the memory system 10.

The processor 220 may include a micro control unit (MCU) and/or a central processing unit (CPU). The processor 220 may process requests transmitted from the host 20. To process the requests transmitted from the host 20, the processor 220 may drive a code-based instruction or algorithm (for example, firmware) loaded into the memory 230, and control internal function blocks such as the host interface 210, the memory 230, and the memory interface 240 and the nonvolatile memory device 100.

The processor 220 may generate control signals for controlling operations of the nonvolatile memory device 100 based on the requests transmitted from the host 20 and provide the generated control signals to the nonvolatile memory device 100 through the memory interface 240.

The memory 230 may include a random-access memory (RAM) such as a dynamic random-access memory (DRAM) and a static random-access memory (SRAM). The memory 230 may store firmware driven through the processor 220. The memory 230 may also store data (for example, meta data) required for driving the firmware. For example, the memory 230 may be operated as a working memory of the processor 220.

In an embodiment, the memory 230 may include regions used for various purposes, such as a region storing a flash translation layer (FTL), a region serving as a command queue (CMDQ) for queuing commands corresponding to requests provided from the host 20, a region serving as a write data buffer in which write data is to be temporarily stored, a region serving as a read data buffer in which read data is to be temporarily stored, and a region serving as a map cache buffer in which map data is to be cached.

The memory interface 240 may control the nonvolatile memory device 100 under the control of the processor 220. The memory interface 240 may also be referred to as a memory controller. The memory interface 240 may provide control signals to the nonvolatile memory device 100 through a channel CH. The control signals may include a command, an address, an operation control signal, and the like for controlling the nonvolatile memory device 100. The memory interface 240 may provide data stored in the data buffer to the nonvolatile memory device 100 or store data transmitted from the nonvolatile memory device 100 in the data buffer.

The memory control module 250 may access the memory 230 and the host memory 21 for data processing according to a command from the processor 220.

For example, the memory control module 250 may process data by accessing the memory 230 when an access address included in the command from the processor 220 is an address of the memory 230. Further, the memory control module 250 may process data by accessing the host memory 21 when the access address included in the command from the processor 220 is an address of the host memory 21.

The address of the host memory 21 included in the command from the processor 220 may be a virtual address of a host memory buffer (HMB) map table managed through the address unit 260. For example, the memory control module 250 may convert the virtual address into the address of the host memory 21 through the address unit 260 and then access the host memory 21 based on the address of the host memory.

The address unit 260 may convert the virtual address into the address of the host memory 21 so that the memory control module 250 may access the most memory 21. The address unit 260 may be operationally disposed between the memory control module 250 and the host interface 210 as illustrated in FIG. 5. In an embodiment, the address unit 260 may be physically located between the memory control module 250 and the host interface 210 as illustrated in FIG. 5.

The configuration of the controller in FIG. 1 is illustrated merely as an example, and the controller 200 may be implemented to include other components in addition to the components included in the controller 200.

FIGS. 2 and 3 are diagrams describing an operating method of the memory system 10 shown in FIG. 1.

Referring to FIG. 2, at step S210, the host 20 may allocate partial regions of the host memory 21 to be used through the memory system 10. Hereinafter, the allocated host memory regions may be referred to as an HMB. For example, the HMB may denote the partial regions of the host memory 21 that the host 20 sets to allow the controller to access the host memory 21. As illustrated in FIG. 3(*a*), the host 20 may allocate partial host memory regions Region_2, Region_4, Region_6, Region_8, and Region_10 (hereinafter, referred to as HMB_0, HMB_1, HMB_2, HMB_3, and HMB_4) among host memory regions Region_0 to Region_11 included in the host memory 21 as HMB regions.

In an embodiment, the allocated host memory regions (i.e., the HMB regions) may have different sizes from each other. For example, as illustrated in FIG. 3(*a*), the HMB regions HMB_0 and HMB_1 may have the different sizes from each other.

In an embodiment, the allocated host memory regions may be arranged nonconsecutively. For example, as illustrated in FIG. 3(*a*), the non-allocated host memory region Region_3 may be arranged between the allocated host memory regions HMB_0 and HMB_1.

At step S220, the memory system 10 may divide the HMB by a preset size as illustrated in FIG. 3(*b*). For example, as illustrated in FIG. 3(B), the address unit 260 may generate a plurality of sub host memory regions sub_0 to sub_10, i.e., sub HMB regions, by dividing the HMB including the HMB regions HMB_0 to HMB_4 by the preset size.

In an embodiment, the preset size may correspond to a unit of data processed through the controller 200.

At step S230, the memory system 10 may designate (or determine) index values for the plurality of sub host memory regions sub_0 to sub_10 (i.e., sub HMB regions). For example, the address unit 260 may designate the index values for physical addresses of the plurality of sub host memory regions sub_0 to sub_10 on the basis of a base address illustrated in FIG. 3(*b*).

In an embodiment, the base address may be an address of an HMB region (for example, HMB_0) having the smallest physical address value among the plurality of HMB regions HMB_0 to HMB_4 constituting the HMB or an address of a sub host memory region (for example, sub_0) having the smallest physical address value among the plurality of sub host memory regions sub_0 to sub_10 (i.e., sub HMB regions).

At step S240, the memory system 10 may designate virtual addresses for the plurality of sub host memory regions sub_0 to sub_10. The address unit 260 may assign offset indexes to the plurality of sub host memory regions sub_0 to sub_10 in ascending index order. For example, as illustrated in FIG. 3(*c*), the address unit 260 may assign the offset indexes to the plurality of sub host memory regions sub_0 to sub_10 from the sub host memory region (for example, sub_0) having the lowest index value to the sub host memory region (for example, sub_10) having the highest index value, among the plurality of sub host memory regions.

In an embodiment, the virtual addresses of the plurality of sub host memory regions sub_0 to sub_10 may be linear addresses which are continuously assigned addresses.

At step S250, the memory system 10 may generate the HMB map table. For example, the address unit 260 may generate the HMB map table in which the index values of the plurality of sub host memory regions sub_0 to sub_10 and the virtual addresses are mapped as illustrated in FIG. 3(*d*). Even when the host 20 may discontinuously allocate the host memory regions of the host memory 21, which are the HMB regions constituting the HMB, to the memory system 10, the memory control module 250 may access the HMB using the virtual addresses of the HMB map table, sequentially mapped to the plurality of sub host memory regions, i.e., linear addresses, and thus the memory control module 250 may recognize that the HMB exists as a separate memory such as a single SRAM.

In an embodiment, the address unit 260 may store the generated HMB map table.

FIGS. 4 and 5 are diagrams describing an operating method of a memory system 10 shown in FIG. 1.

Referring to FIG. 4, at step S410, the memory system 10 may receive a data processing command. For example, the controller 200 may receive the commands for data processing operations such as data read, data write, and the like from the host 20.

At step S420, the memory system 10 may determine whether to access the host memory 21 included in the host 20 or the memory 230 included in the controller 200. For example, the controller 200 may determine whether an address of a memory region to be accessed is an address of the HMB or an address of the memory 230. That is, when the address of the memory region is the virtual address included in the HMB map table, the controller 200 may determine that the HMB is to be accessed.

At step S430, when the address of the memory region is the virtual address (i.e., in case of "YES" at step S420), the memory system 10 may convert the virtual addresses into the physical addresses of the host memory 21. For example, as illustrated in FIG. 5, the memory control module 250 may transmit an access request including a target virtual address (for example, virtual address 3) among the plurality of virtual addresses to the address unit 260 for data processing (①). The address unit 260 may change the target virtual address (for example, virtual address 3) included in the access request to a target index value (for example, index 4), which is an index value mapped to the target virtual address, based on the HMB map table (②). The address unit 260 may finally convert the virtual address mapped to the index 4 into the physical address of the host memory 21. For example, the address unit 260 may determine an address, in which the address value corresponding to the index 4 is added to the physical address of the sub HMB region sub_0, as the physical address of the host memory 21, which is to be accessed by the controller 200.

At step S440, the memory system 10 may access the host memory 21. For example, as illustrated in FIG. 5, the memory control module 250 may access (i.e., store data or read stored data in or from) a sub HMB region (for example, sub_4) corresponding to the target offset value among the addresses of the host memory 21 when the address of the memory region to be accessed for data processing is the address of HMB (③).

At step S450, in the case of "NO" at step S420, the memory system 10 may access the memory 230 of the controller 200. For example, the memory control module 250 may access the memory 230 of the controller 200 (e.g., store data or read stored data in or from the memory 230) when the address of the memory region to be accessed for data processing is the address of the memory 230 of the controller 200.

Accordingly, even when the partial host memory regions among the plurality of host memory regions included in the host memory 21 are discontinuously allocated as the HMB regions, the memory system 10 may manage the HMB using the HMB map table that the virtual addresses as linear addresses are mapped to the discontinuously allocated host memory regions, and thus the linearity of addresses for accessing to the host memory 21 may be ensured.

FIG. 6 is a block diagram illustrating a data processing system 2000 including a solid-state drive (SSD) 2200 according to an embodiment of the present disclosure. Referring to FIG. 6, the data processing system 2000 may include a host 2100 and the SSD 2200.

The SSD 2200 may include a controller 2210, a buffer memory 2220, nonvolatile memory devices 2231 to 223n, a power supply 2240, a signal connector 2250, and a power connector 2260.

The controller 2210 may control an overall operation of the SSD 2200.

The buffer memory 2220 may temporarily store data which are to be stored in the nonvolatile memory devices 2231 to 223n. Further, the buffer memory 2220 may temporarily store data which are read out from the nonvolatile memory devices 2231 to 223n. The data temporarily stored in the buffer memory 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to one channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be normally terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured of various types of connectors according to an interface scheme between the host 2100 and the SSD 2200.

Figure 7:
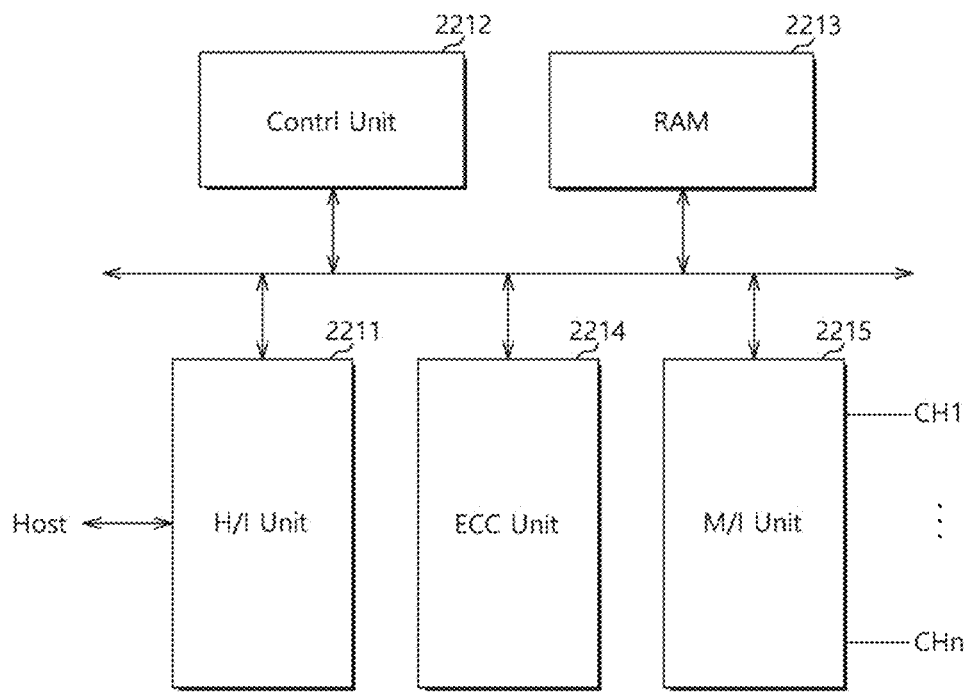
FIG. 7 is a diagram illustrating a configuration of a controller shown in FIG. 6 according to an embodiment of the present disclosure.

FIG. 7 is a block diagram illustrating the controller 2210 illustrated in FIG. 6, Referring to FIG. 7, the controller 2210 may include a host interface (H/I) unit 2211, a control unit 2212, a random-access memory (RAM) 2213, an error correction code (ECC) unit 2214, and a memory interface (M/I) unit 2215.

The host interface unit 2211 may provide interfacing between the host 2100 and the SSD 2200 according to a protocol of the host 2100. For example, the host interface unit 2211 may communicate with the host 2100 through any one among SD, USB, MMC, embedded MMC (eMMC), PCMCIA, PATA, SATA, SCSI, SAS, PCI, PCI-E, and UFS protocols. In addition, the host interface unit 2211 may perform a disk emulating function of supporting the host 2100 to recognize the SSD 2200 as a general-purpose memory system, for example, a hard disk drive (HDD).

The control unit 2212 may analyze and process the signal SGL inputted from the host 2100. The control unit 2212 may control operations of internal function blocks according to firmware or software for driving the SSD 2200. The random-access memory 2213 may be used as a working memory for driving such firmware or software.

The ECC unit 2214 may generate parity data of data to be transmitted to the nonvolatile memory devices 2231 to 223n. The generated parity data may be stored, along with the data, in the nonvolatile memory devices 2231 to 223n. The ECC unit 2214 may detect errors of data read out from the nonvolatile memory devices 2231 to 223n based on the parity data. When the detected errors are within a correctable range, the ECC unit 2214 may correct the detected errors.

The memory interface unit 2215 may provide control signals such as commands and addresses to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory 2220 to the nonvolatile memory devices 2231 to 223n or provide data read out from the nonvolatile memory devices 2231 to 223n to the buffer memory 2220.

Figure 8:
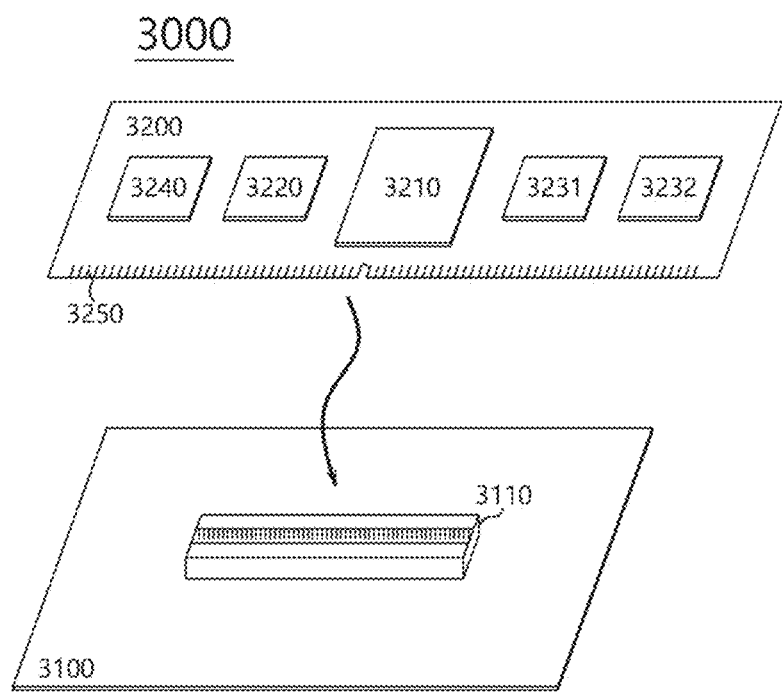
FIG. 8 is a diagram illustrating a data processing system including a memory system according to an embodiment of the present disclosure.

FIG. 8 is a diagram illustrating a data processing system 3000 including a memory system 3200 according to an embodiment of the present disclosure. Referring to FIG. 8, the data processing system 3000 may include a host 3100 and a memory system 3200.

The host 3100 may be configured in the form of a board such as a printed circuit board. Although not shown in FIG. 8, the host 3100 may include internal function blocks for performing functions of the host.

The host 3100 may include a connection terminal 3110 such as a socket, a slot or a connector. The memory system 3200 may be mounted on the connection terminal 3110.

The memory system 3200 may be configured in the form of a board such as a printed circuit board. The memory system 3200 may be a memory module or a memory card. The memory system 3200 may include a controller 3210, a buffer memory 3220, nonvolatile memory devices 3231 and 3232, a power management integrated circuit (PMIC) 3240, and a connection terminal 3250.

The controller 3210 may control an overall operation of the memory system 3200. The controller 3210 may be configured in the same manner as the controller 2210 shown in FIG. 7.

The buffer memory 3220 may temporarily store data to be stored in the nonvolatile memory devices 3231 and 3232. Further, the buffer memory 3220 may temporarily store data read out from the nonvolatile memory devices 3231 and 3232. The data temporarily stored in the buffer memory 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host 3100. Through the connection terminal 3250, signals such as commands, addresses, and data, and power may be transferred between the host 3100 and the memory system 3200. The connection terminal 3250 may be configured as various types depending on an interface scheme between the host 3100 and the memory system 3200. The connection terminal 3250 may be disposed on any one side of the memory system 3200.

Figure 9:
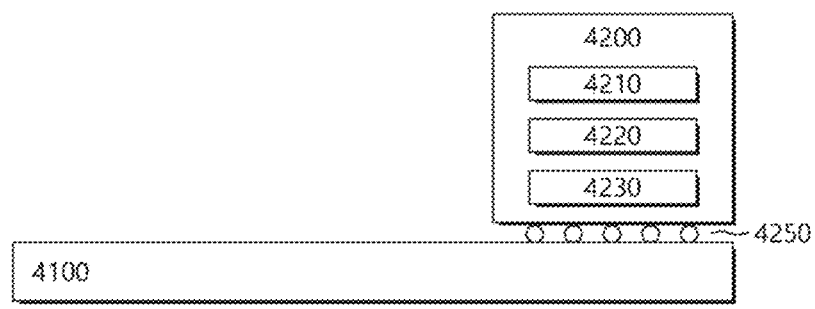
FIG. 9 is a diagram illustrating a data processing system including a memory system according to an embodiment of the present disclosure.

FIG. 9 is a block diagram illustrating a data processing system 4000 including a memory system 4200 according to an embodiment of the present disclosure. Referring to FIG. 9, the data processing system 4000 may include a host 4100 and the memory system 4200.

The host 4100 may be configured in the form of a board such as a printed circuit board (PCB). Although not shown in FIG. 9, the host 4100 may include internal function blocks for performing functions of the host.

The memory system 4200 may be configured in the form of a surface-mounting type package. The memory system 4200 may be mounted on the host 4100 through solder balls 4250. The memory system 4200 may include a controller 4230, a buffer memory 4220, and a nonvolatile memory device 4210.

The controller 4230 may control an overall operation of the memory system 4200. The controller 4230 may be configured in the same manner as the controller 2210 shown in FIG. 7.

The buffer memory 4220 may temporarily store data to be stored in the nonvolatile memory device 4210. Further, the buffer memory 4220 may temporarily store data read out from the nonvolatile memory device 4210. The data temporarily stored in the buffer memory 4220 may be transmitted to the host 4100 or the nonvolatile memory device 4210 according to control of the controller 4230.

The nonvolatile memory device 4210 may be used as a storage medium of the memory system 4200.

Figure 10:
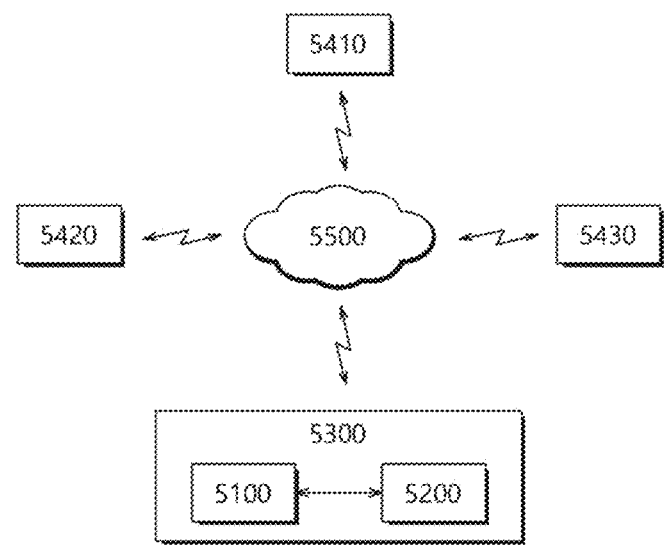
FIG. 10 is a diagram illustrating a network system including a memory system according to an embodiment of the present disclosure.

FIG. 10 is a diagram illustrating a network system 5000 including a memory system 5200 according to an embodiment of the present disclosure. Referring to FIG. 10, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and the memory system 5200. The memory system 5200 may be configured of the memory system 10 illustrated in FIG. 1, the memory system 2200 illustrated in FIG. 6, the memory system 3200 illustrated in FIG. 8, or the memory system 4200 illustrated in FIG. 9.

Figure 11:
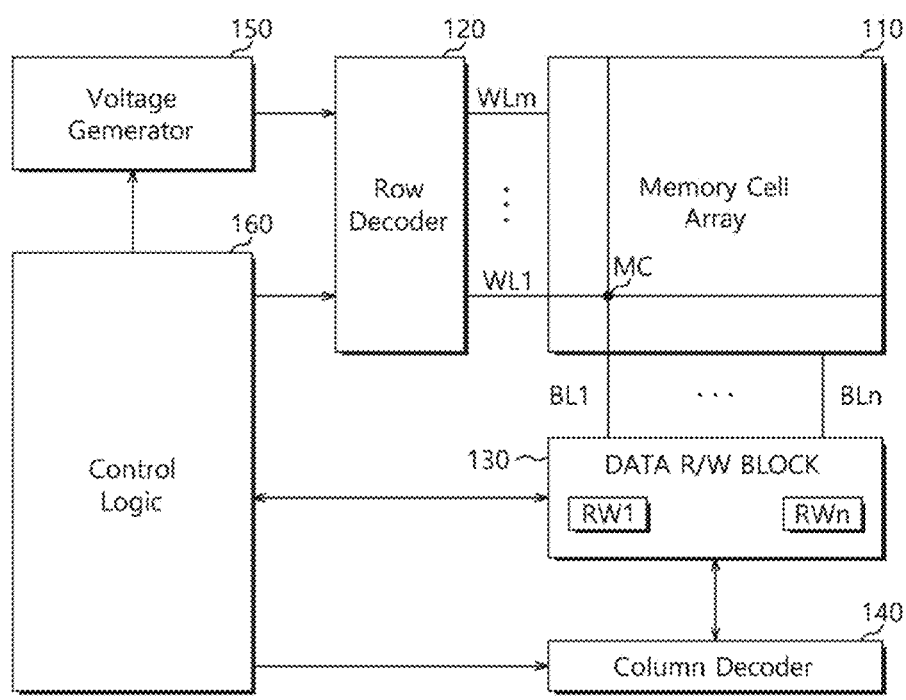
FIG. 11 is a block diagram illustrating a nonvolatile memory device included in a memory system according to an embodiment of the preset disclosure.

FIG. 11 is a detailed diagram of the nonvolatile memory device 100 included in the memory system 10 shown in FIG. 1. Referring to FIG. 11, the nonvolatile memory device 100 may include the memory cell array 110, a row decoder 120, a data read/write (R/W) block 130, a column decoder 140, a voltage generator 150, and a control logic 160.

The memory cell array 110 may include the memory cells MC which are arranged in regions where the word lines WL1 to WLm and the bit lines BL1 to BLn cross each other.

The row decoder 120 may be coupled with the memory cell array 110 through the word lines WL1 to WLm. The row decoder 120 may operate according to control of the control logic 160. The row decoder 120 may decode addresses provided from an external device (not shown). The row decoder 120 may select and drive the word lines WL1 to WLm, based on the decoding results. For example, the row decoder 120 may provide word line voltages provided from the voltage generator 150, to the word lines WL1 to WLm.

The data read/write block 130 may be coupled with the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided from the external device, in the memory cell array 110 in a write operation. In another example, the data read/write block 130 may operate as a sense amplifier which reads out data from the memory cell array 110 in a read operation.

The column decoder 140 may operate according to control of the control logic 160. The column decoder 140 may decode addresses provided from the external device. The column decoder 140 may couple data input/output lines (or data input/output buffers) with the read/write circuits RW1 to RWn of the data read/write block 130 which respectively correspond to the bit lines BL1 to BLn, based on decoding results.

The voltage generator 150 may generate voltages to be used in internal operations of the nonvolatile memory device 100. The voltages generated by the voltage generator 150 may be applied to the memory cells MC of the memory cell array 110. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells on which the read operation is to be performed.

The control logic 160 may control an overall operation of the nonvolatile memory device 100, based on control signals provided from the external device. For example, the control logic 160 may control operations of the nonvolatile memory device 100 such as read, write, and erase operations of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A controller for controlling a nonvolatile memory device according to a request from a host with a host memory, the controller comprising:
   an address unit configured to divide regions of the host memory, which is allocated as a host memory buffer (HMB), to generate a plurality of sub HMB regions, determine index values of the plurality of sub HMB regions, and generate an HMB map table by mapping virtual addresses to the index values; and
   a memory control module configured to access at least one among the plurality of sub HMB regions based on the HMB map table,
   wherein the virtual addresses are set to continuous values with respect to the plurality of sub HMB regions.

2. The controller of claim 1, wherein the address unit determines the index values based on a physical address of a sub HMB region corresponding to the smallest address value among physical addresses of the plurality of sub HMB regions.

3. The controller of claim 1, wherein the address unit sequentially maps the virtual addresses to the index values from the smallest index value among the index values in ascending order.

4. The controller of claim 1, wherein, when the memory control module requests an access to the host memory with a virtual address, the address unit converts the virtual address, into an index value mapped to the virtual address based on the HMB map table, and determines a physical address of the host memory according to the converted index value.

5. The controller of claim 1, wherein the address unit divides the plurality of regions of the host memory by a unit of data processed in the controller.

6. The controller of claim 1, wherein the plurality of regions allocated as the HMB are set to be accessed by the controller, among a plurality of regions of the host memory.

7. The controller of claim 1, wherein the plurality of regions allocated as the HMB include at least one region having a different size from those of the other regions.

8. The controller of claim 1, wherein a physical address of at least one sub HMB region among the plurality of sub HMB regions is discontinuous to physical addresses of the other sub HMB regions.

9. An operating method of a controller for controlling a nonvolatile memory device according to a request from a host with a host memory, the method comprising:
   dividing regions of the host memory, which is allocated as a host memory buffer (HMB), to generate a plurality of sub HMB regions;
   determining index values for addresses of the plurality of sub HMB regions; and
   generating an HMB map table by mapping virtual addresses to the determined index values,
   wherein the virtual addresses are set to continuous values with respect to the plurality of sub HMB regions.

10. The operating method of claim 9, wherein the determining of the index values includes determining the index values on the basis of a physical address of a sub HMB region corresponding to the smallest address value among physical addresses of the plurality of sub HMB regions.

11. The operating method of claim 9, wherein the generating of the HMB map table includes sequentially mapping the virtual addresses to the index values from the smallest index value among the index values in ascending order.

12. The operating method of claim 9, further comprising:
   converting a virtual address into an index value mapped to the virtual address based on the HMB map table; and
   accessing a physical address of the host memory according to the converted index value.

13. The operating method of claim 9, wherein the plurality of regions of the host memory are divided by a unit of data processed in the controller.

14. The operating method of claim 9, wherein the plurality of regions allocated as the HMB are set to be accessed by the controller, among a plurality of regions of the host memory.

15. The operating method of claim 9, wherein the plurality of regions allocated as the HMB include at least one region having a different size from those of the other regions.

16. The operating method of claim 9, wherein a physical address of at least one sub HMB region among the plurality of sub HMB regions is discontinuous to physical addresses of the other sub HMB regions.

17. A memory system comprising:
   a nonvolatile memory device; and
   a controller configured to control the nonvolatile memory device according to a request from a host with a host memory,
   wherein the controller divides regions of the host memory, which is allocated as a host memory buffer (HMB), to generate a plurality of sub HMB regions, determines offset values for addresses of the plurality of sub HMB regions, and generates an HMB map table by mapping virtual addresses to the offset values.

18. The memory system of claim 17, wherein the controller accesses at least one of the plurality of sub HMB regions by converting at least one target virtual address among the virtual addresses into an offset value mapped to the target virtual address based on the HMB map table.

* * * * *